US 8,843,365 B2

(12) United States Patent
McGowan (10) Patent No.: US 8,843,365 B2
(45) Date of Patent: Sep. 23, 2014

(54) METHOD AND APPARATUS OF VISUAL FEEDBACK FOR LATENCY IN COMMUNICATION MEDIA

(75) Inventor: James W. McGowan, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 833 days.

(21) Appl. No.: 13/084,897

(22) Filed: Apr. 12, 2011

(65) Prior Publication Data

US 2012/0265524 A1    Oct. 18, 2012

(51) Int. Cl.
*G10L 19/00* (2013.01)
*H04L 12/26* (2006.01)
*H04L 12/24* (2006.01)
*H04M 3/22* (2006.01)

(52) U.S. Cl.
CPC ............ *H04L 43/0852* (2013.01); *H04L 41/22* (2013.01); *H04M 3/2236* (2013.01)
USPC .......................................... 704/201; 704/228

(58) Field of Classification Search
USPC ................... 704/221, 228; 370/254
See application file for complete search history.

(56) References Cited

U.S. PATENT DOCUMENTS

| | | | | |
|---|---|---|---|---|
| 8,320,261 | B2 * | 11/2012 | Vasamsetti et al. | 370/242 |
| 8,503,669 | B2 * | 8/2013 | Mao | 379/406.06 |
| 2004/0247112 | A1 * | 12/2004 | Lee et al. | 379/414 |
| 2006/0187970 | A1 | 8/2006 | Lee et al. | |
| 2008/0080702 | A1 * | 4/2008 | Zhang et al. | 379/406.08 |
| 2012/0219146 | A1 * | 8/2012 | Mason | 379/406.01 |

\* cited by examiner

*Primary Examiner* — Douglas Godbold
(74) *Attorney, Agent, or Firm* — Wolff & Samson, PC.

(57) ABSTRACT

A method and apparatus are provided for visualizing the latency in a conversation between a local speaker and at least one remote speaker separated from the local speaker by a communication medium. A latency estimate is obtained. A timing indication of at least the end of a conversational turn by the local speaker is obtained, and an outbound graphic is displayed, indicating the progress of at least the end-of-turn across the communication medium toward the remote speaker. The outbound graphical indication is displayed with a transit time across the medium that is derived from the latency estimate. An inbound graphic is displayed, indicating the progress across the communication medium toward the local speaker, of a start of a conversational turn by the remote speaker, which is imputed to begin when the remote speaker receives the local speaker's end-of-turn. The inbound graphical indication is displayed with a transit time across the medium that is derived from the latency estimate.

16 Claims, 5 Drawing Sheets

METHOD AND APPARATUS OF VISUAL FEEDBACK FOR LATENCY IN COMMUNICATION MEDIA

FIELD OF THE INVENTION

The invention relates to communication terminals, and more specifically to diagnostic functions performed by communication terminals.

ART BACKGROUND

One problem faced by users of telecommunication systems is that conversations may suffer from unnaturally high end-to-end delay, which we refer to here as latency. When the latency is high enough, it can disrupt normal conversational behavior, for example by causing speakers at the respective ends of the conversation to talk over one another and thus forcing them to expressly negotiate whose turn it is to speak. In view of this problem, users of citizens band radio long ago adopted the convention of saying "over" at the end of each conversational turn. However, such a convention would be unacceptable for high-quality communications.

User dissatisfaction may be aggravated by a common misunderstanding: the problem is often misattributed to poor etiquette, while the role of latency goes unrecognized.

In the case of video reception, the problem may also be misattributed to incompetent operators or faulty equipment at the transmission end. This may be especially troublesome when news correspondents, for example, are reporting from a great distance over a satellite link, which will typically have relatively large delays.

In the past, it has been common practice to simply rely on adaptation by the users of high-latency communications. Purely by listening (which provides auditory feedback), users are generally able to adapt from a range of zero to 150 msec of delay, which is perceived as "normal", to roughly 400 msec of delay. Simple reliance on user adaptation has generally been satisfactory for casual conversations over free-of-charge systems, where user expectations are relatively low. However, it has not, in general, been highly satisfactory to users of regular mobile calls, particularly when attempting to engage in fast-moving dialogue.

SUMMARY OF THE INVENTION

Provided here is a visual indicator of the conversation or other two-way communication. The visual indicator can illustrate the propagation of each conversational turn across the communication medium and thus illustrate the latencies in a natural way, which may help the users to accommodate longer delays. This, in turn, will increase the Quality of Experience (QoE) for end users without incurring any additional cost to the operator.

Accordingly, in an embodiment, a method performed in a communication terminal includes obtaining an estimate of latency in a conversation between a local speaker and each of one or more remote speakers separated from the local speaker by a communication medium.

The method includes obtaining a timing indication of at least an end of a conversational turn vocalized by the local speaker. The method further includes displaying an outbound graphical indication of progress of at least the end-of-turn across the communication medium toward one or more remote speakers. The outbound graphical indication is displayed with a transit time across the medium that is derived from the latency estimate.

The method further includes estimating an arrival time from the latency estimate. By "arrival time" is meant a time at which at least a given remote speaker will receive the end-of-turn.

The method further comprises imputing a conversational turn vocalized by at least the given remote speaker, including a start-of-turn imputed from the pertinent arrival time; and displaying an inbound graphical indication of progress, across the communication medium toward the local speaker, of at least the start-of-turn from at least the given remote speaker. The inbound graphical indication is displayed with a transit time across the medium that is derived from the latency estimate.

DETAILED DESCRIPTION

In an illustrative scenario, a conversation is occurring between Alice and Bob. By "conversation" is meant any two-way communication between parties over a communication medium. Also included in our definition is a conversation between a particular pair of parties to a communication session in which additional parties are also participating. However, for simplicity, our illustrative scenario will involve only two parties.

Figure 1:
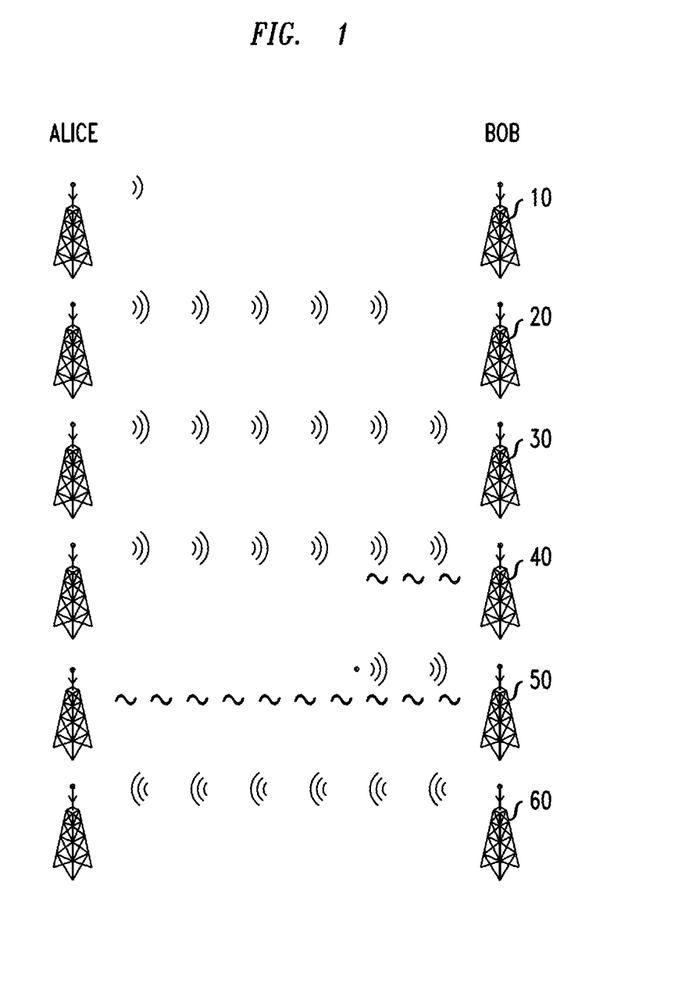
FIG. 1 is a view of a display showing the progression of speech events across a communication medium.

Accordingly, the conversation may, e.g., be a regular video conference or a mobile call, or Alice may be a local reporter talking to a remote correspondent on a split screen display. Turning to FIG. 1, each of the rows displayed there represents a snapshot of the conversation at one of a succession of moments in time, as it would be seen from Alice's perspective.

As shown in row 10, Alice first begins talking, and her icon begins sending graphical symbols representing her speech. As Alice continues to talk, additional speech symbols appear and drift toward Bob, as seen in row 20. In row 30, the drifting of the speech symbols reach all the way to Bob's icon, indicating that Alice's speech has begun to reach Bob.

Of course there is no instantaneous method for Bob to signal Alice that her speech has begun to arrive. Instead, the arrival time for Alice's speech is imputed from a known estimate of the latency in the communication medium. By "latency in the communication medium" is meant the total latency experienced by the users, regardless of source. Thus, for example, a Voice-over-IP (VoIP) network may exhibit, in addition to the delays experienced in a circuit-switched telephone call, delays attributable to any of speech coding and decoding, other processing, buffering, and adverse network traffic conditions.

Accordingly, the displayed latency between row 10 and row 30 corresponds to an estimate of the one-way latency in the communication medium between Alice and Bob. The one-way latency will typically be estimated as one-half the round-trip latency. Methods for estimating the latency will be discussed in detail below.

In row 40, Alice is still talking. Because Alice's conversational turn has not yet come to an end, Bob is presumed to be listening, and not to have commenced his own conversational turn. Accordingly, outgoing graphical symbols are seen in the figure as returning from Bob's icon. The particular symbols that are displayed represent silence, to indicate that Bob is now hearing Alice, but has not yet responded.

If Bob is known to be sending video, then at the moment when Bob's outgoing symbols reach Alice's icon, Alice will expect to see Bob's physical reaction on her video screen, but because she is still talking, Alice will not expect to hear a spoken response from Bob.

In row 50, the end of her train of graphical symbols indicates that Alice has already stopped speaking. In a face-to-face conversation, Alice would now expect to hear Bob commence his conversational turn, i.e., start talking. However, it is evident from the figure that Alice's final utterances, marking the end of her conversational turn, have not yet reached Bob. Consequently, Bob does not yet have notice that it is his turn to speak, and even if he were to break in at this point, his speech will not have had time to reach Alice.

When Alice's final utterances reach Bob, he may be expected to respond (typically after a brief pause). Accordingly, an outgoing train of graphical speech symbols will replace Bob's silence symbols, as seen in row 60. The leading edge of Bob's speech train will be displayed as crossing the communication medium with a transit time equal to the one-way latency.

It should be noted in this regard that Alice cannot actually know when Bob is speaking until his speech arrives at her terminal. Therefore, she cannot track his actual speech across the network. (If it were possible to instantaneously signal the commencement of Bob's conversational turn, then of course it would be possible to communicate without latency.)

Likewise, Bob cannot actually know when Alice is speaking until her speech arrives at his terminal. Therefore, the icon representing Alice on Bob's terminal begins to emit speech symbols only when Alice's initial utterances, marking the beginning of her first conversational turn, are received at Bob's terminal. Thereafter, whenever Bob speaks, he will see his speech symbols traversing the network. At the end of each of his conversational turns, he will be able to judge the return latency from the incoming train of Alice's imputed speech symbols. This will tell Bob when to expect an audible response from Alice.

Those skilled in the art will of course appreciate that many variations of the scenario described above may be implemented without departing from our basic approach. In some implementations, other types of events may be displayed. For example, if Bob and Alice take overlapping conversational turns, a collision may be graphically represented, indicating a breakdown in the conversation.

In other examples, Bob and Alice are on a multiparty call with a central bridge. In such scenarios, each party to the call may have an icon, and the progress of each party's speech may be graphically represented. For example, all speech might be shown as progressing toward a central icon, with the icons for the individual parties arranged around the central icon.

In a multiparty arrangement using a central bridge, the latency that, for example, Alice ascribes to Bob will be the sum of Bob's latency relative to the bridge plus the bridge's latency relative to Alice. Likewise for Alice in relation to each other party on the call. Given her own latency relative to the bridge, Alice can readily estimate the latency between each other pair of parties as the sum of the respective parties' own latencies relative to the bridge. Alice may in some cases be able to determine her own latency relative to the bridge by direct measurement. Alternatively, Alice can estimate her latency relative to the bridge from information fed back by at least one other party to the group call. That is, given parties Alice, Bob, and Carol, and given that Alice's total latencies with respect to Bob and Alice are $\Lambda_{AB}$ and $\Lambda_{AC}$, respectively, it follows that the total latency between Bob and Carol (which may be measured by one of those parties and fed back to Alice) is $\Lambda_{AB}+\Lambda_{AC}-2\Lambda_{bridge}$, where $\Lambda_{bridge}$ is Alice's total latency with respect to the bridge.

Figure 2:
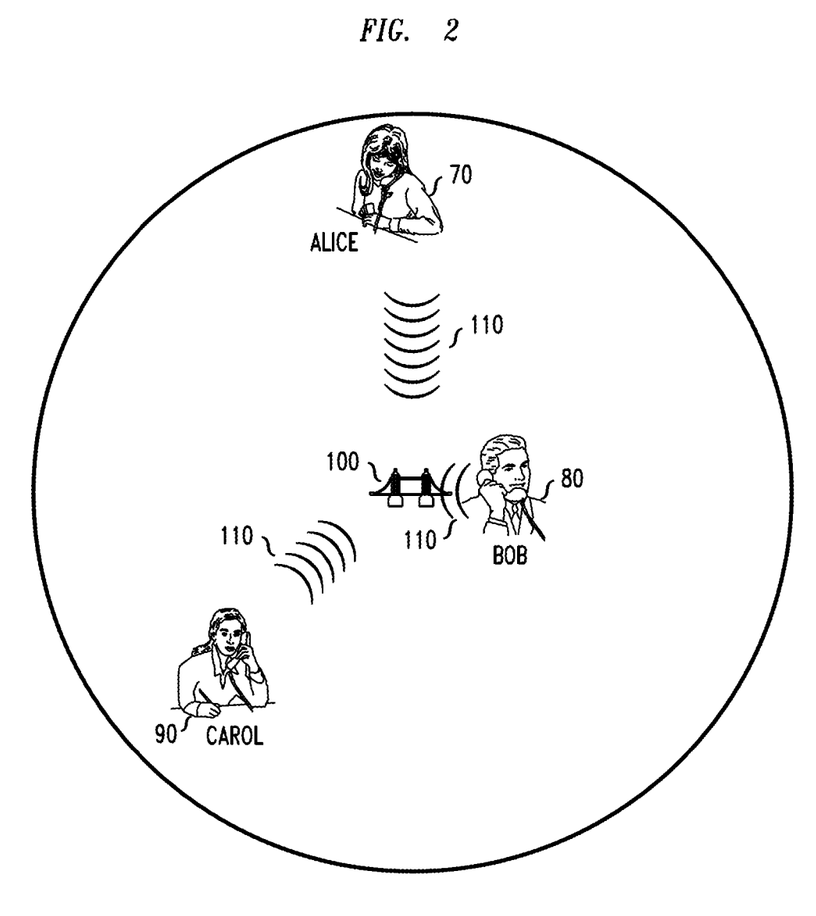
FIGS. 2 and 3 are views of one possible graphical display format for a multiple party call using a central conference bridge, according to the invention in an embodiment.
Figure 3:
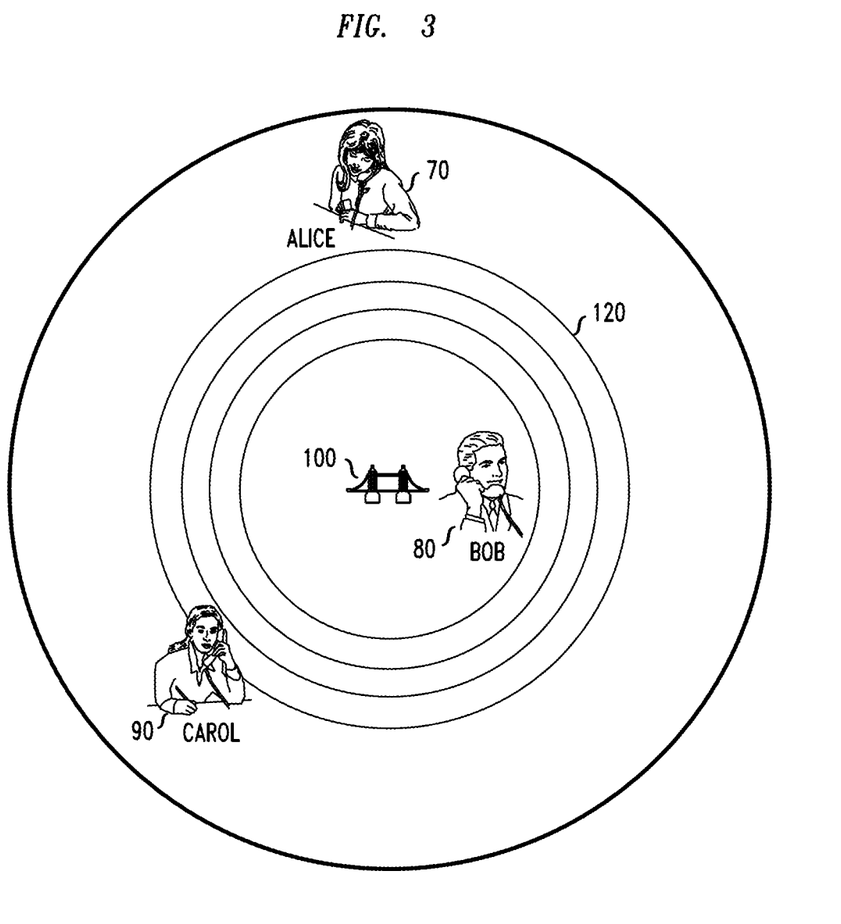

Accordingly, one possible format for a display, as shown in FIGS. 2 and 3, arranges the icons 70-90 representing the respective parties at varying distances from an icon 100 representing the central bridge. The respective distances are selected according to each party's latency relative to the central bridge. The graphical representation 110 of each party's actual or imputed speech may be shown as progressing along a straight path toward the central bridge icon. As shown in FIG. 3, after reaching the central icon, the speech representation may change to, e.g., a sequence of expanding rings 120 that are centered on the central icon and spread outward so that they reach each user icon after a delay corresponding to the respective distance of that icon from the center.

In a multiparty call that does not use a central bridge, each user may perform an independent determination of the latency with respect to each other user and may control the graphical display accordingly.

Moreover, it will be understood that our approach allows for a great variety of graphical symbols to be displayed. For example, elongating bars may be used in place of symbol trains to represent the progress of signals. Changes of state such as the actual or imputed arrival of a start of a conversational turn or the imputed arrival of the end of a conversational turn may be indicated, e.g., by a change of color or brightness. Numerous other variations will be apparent to those skilled in the art.

We turn now to a discussion of several exemplary methods for estimating the latency. The examples to be described are purely illustrative, and are not meant to exclude other possible methods of latency estimation. For simplicity, we will continue to refer to the near-end party who makes and uses the latency estimates as "Alice", and to the far-end party as "Bob".

In one approach, Alice tracks the time it takes for Bob's speech to come back after the end of Alice's conversational turn. The event that indicates the end of Alice's conversational turn is, e.g., near-end silence for a specified interval of time. The event that indicates the return of Bob's speech is new far-end speech activity (as received at Alice's terminal) following the end of Alice's conversational turn.

There are various ways to detect the transition from near-end speech to near-end silence. For example, many modern user terminals include a Voice Activity Detector (VAD). An output of the VAD may be tapped to provide a signal indicative of the near-end speech state, i.e. whether it is active or silent. The silent state is timed, and if there is no transition to a new active state before the end of a specified duration, the end of Alice's conversational turn is declared. Likewise, an output of the VAD may be tapped to provide a signal indicative of the far-end speech state, so that receipt of new speech activity may cause the return of Bob's speech to be declared. It should be noted that although it will often be most economical to rely on the VAD built into a conventional user terminal, a VAD may also be added specifically for the purpose of latency estimation.

One alternative to the direct use of a VAD is described in US Patent Application Publication No. 2006/0187970 by M.

Lee et al., published Aug. 24, 2006. There, speech events are detected using the fact that many variable rate speech coder-decoders (codecs) use different code rates depending on whether active speech has been detected. US Patent Application Publication No. 2006/0187970 in its entirety is hereby incorporated herein by reference.

Thus, for example, the speech packets produced by an EVRC vocoder, widely used in CDMA wireless communications, are encoded at full or half rate for active speech and at one-eighth rate for silence. Accordingly, a specified number of sequential one-eighth rate packets may be interpreted as a silence interval, and the beginning of a new conversational turn may be declared if, for example, a full or half rate packet follows a specified number of one-eighth rate packets. If the vocoder is of a type that suppresses the one-eighth rate packets, a timing procedure based on an internal clock or on the well-known Real-Time Protocol (RTP) can be used in lieu of the counting of packets representing the silence interval. The coding rate of a packet is readily determined from the number of bits returned from the encoder, or from its network transport information, such as an associated RTP header.

A more sophisticated use of speech events to estimate delay is described in US Patent Application Publication No. 2004/0247112 by M. Lee et al., published Dec. 9, 2004. US Patent Application Publication No. 2004/0247112 in its entirety is hereby incorporated herein by reference. As explained there, as many as ten identifiable speech events may be defined based on the on-off patterns in a telephone conversation between two speakers: A talk spurt is a period during which there is speech from either speaker. A conversational period is a pause when there is silence from either speaker, and it is double talk when there is speech from both speakers. There is mutual silence when there is silence from both speakers, and as a special case there is alternative silence when the mutual silence is between the end of one speaker's talk spurt and the beginning of the other speaker's talk spurt. A pause by one speaker is a pause in isolation if the other speaker is silent throughout the pause. Likewise, a talk spurt by one speaker is a solitary talk spurt if the other speaker is silent throughout the talk spurt. A talk spurt by one speaker is an interruption if it interrupts the other speaker. The interrupted speaker's speech prior to the interruption is speech before interruption, and subsequent to the interruption, it is speech after interruption.

Speakers have a known tendency to modify their conversational behavior when transmission delay is present. Of the ten speech events listed above, those most susceptible to such modification are double talk, mutual silence, and alternative silence. Therefore, an estimate of the transmission delay may be derived from an analysis of the statistical patterns of such events.

The above-cited US Patent Publication 2004/0247112, for example, describes a linear regression analysis of a calibration experiment in which various pairs of volunteer speakers engage in a recorded conversation that is subjected to a variable amount of artificial delay. For each of four different speech events, the prevalence of the event as a percentage of total elapsed conversational time is measured as a function of delay. From these data, straightforward linear regression leads to a linear expression for the delay D of the form $$D=c_0+c_1 p_1+c_2 p_2+c_3 p_3+c_4 p_4,$$

in which the $p_i$ are the prevalence values for the respective speech events, $c_o$ is a constant, and each of $c_1$-$c_4$ indicates the sensitivity of the delay to the corresponding speech event.

Thus, for example, the experiment reported in the above-cited patent publication led to the equation, $$D=400+1-(4AS-PI)+5\cdot(3DT-TS),$$

in which AS, PI, DT and TS are the prevalences for alternative silence, pause in isolation, double talk, and talk spurt, respectively. The unit of time is milliseconds.

Yet another way to estimate the transmission delay is with an echo canceller. Echo cancellers, particularly acoustic echo cancellers, are widely used in laptop and personal computers and in conference and mobile phones. For traditional landline telephone handsets, it is more common to locate the echo canceller higher in the communication network.

Particularly useful in this regard is a network acoustic echo canceller (AEC) which seeks to cancel the echo effect of near-end speech which is returned to the local speaker after traversing a round trip through the communication network.

One functional component of an echo canceller is an adaptive filter, which adapts a set of delay coefficients to minimize an error signal which is a measure of residual echo, i.e., of the portion of the round-trip echo-path signal that remains after the current estimate of the echo-path signal has been subtracted from the far-end speech signal. The values of the adapted filter coefficients may provide an estimate of the round-trip transmission delay.

It should also be noted that information about latencies or about speech events may be provided to the user terminal from elsewhere in the network. For example, the echo canceller may be situated at a higher level in the network, such as at a central office. Latency information obtained from the adaptive filter associated with the echo canceller may in that case be transmitted along a portion of the communication network to the user terminal.

In another example, an application running on a server elsewhere in the network creates metadata signaling the start and end of a conversational turn and delivers the metadata together with the underlying voice signal or voice packets. An application running locally in the user terminal interprets the metadata to generate the control signals for the graphical display.

Figure 4:
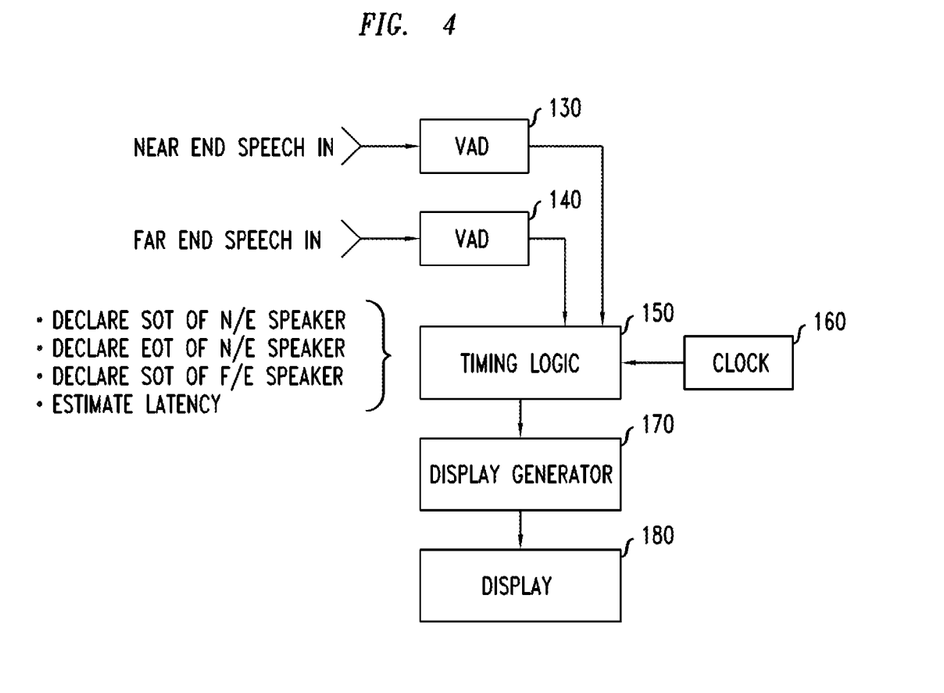
FIG. 4 is a functional diagram of apparatus for providing a visual depiction of transmission latency in a communication system.

FIG. 4 provides a high-level functional view of one possible device, running in or in association with a user terminal, that may implement the method described above. The device as shown will typically be implemented on a hardware device that includes one or more digital signal processors, an appropriate visual display device, and the signal processing and conditioning hardware needed to drive the visual display device.

More generally, a person of skill in the art would also recognize that steps of the above-described method can be performed by programmed computers. Accordingly, some embodiments are also intended to cover program storage devices, for example, digital data storage media, which are machine or computer readable and encode machine-executable or computer-executable programs of instructions, wherein said instructions perform some or all of the steps of said above-described methods. The program storage devices may be, for example, digital memories, magnetic storage media such as a magnetic disks and magnetic tapes, hard drives, or optically readable digital data storage media. The embodiments are also intended to cover computers programmed to perform said steps of the above-described method, whether special-purpose or general-purpose devices, and whether under hardware, firmware, or software program control.

Turning to FIG. 4, it will be seen that voice activity detector (VAD) 130 provides a signal indicating the presence of near-end speech, and the VAD 140 likewise provides a signal indicating the presence of far-end speech. From the VAD output signals, timing logic unit 150 derives timing indications of when a conversational turn starts (Start of Turn: SOT) and ends (End of Turn: EOT) for the near-end speaker, and a timing indication of at least an SOT for the far-end speaker. From these conversational events, the timing logic unit further derives a latency estimate. A timing reference for the timing logic unit is provided by clock circuit 160.

With further reference to the figure, it will be seen that the latency estimate is provided as input to display generator 170, where a graphical display pattern is generated based on the latency estimate. The display generator provides an output signal which drives display device 180.

Figure 5:
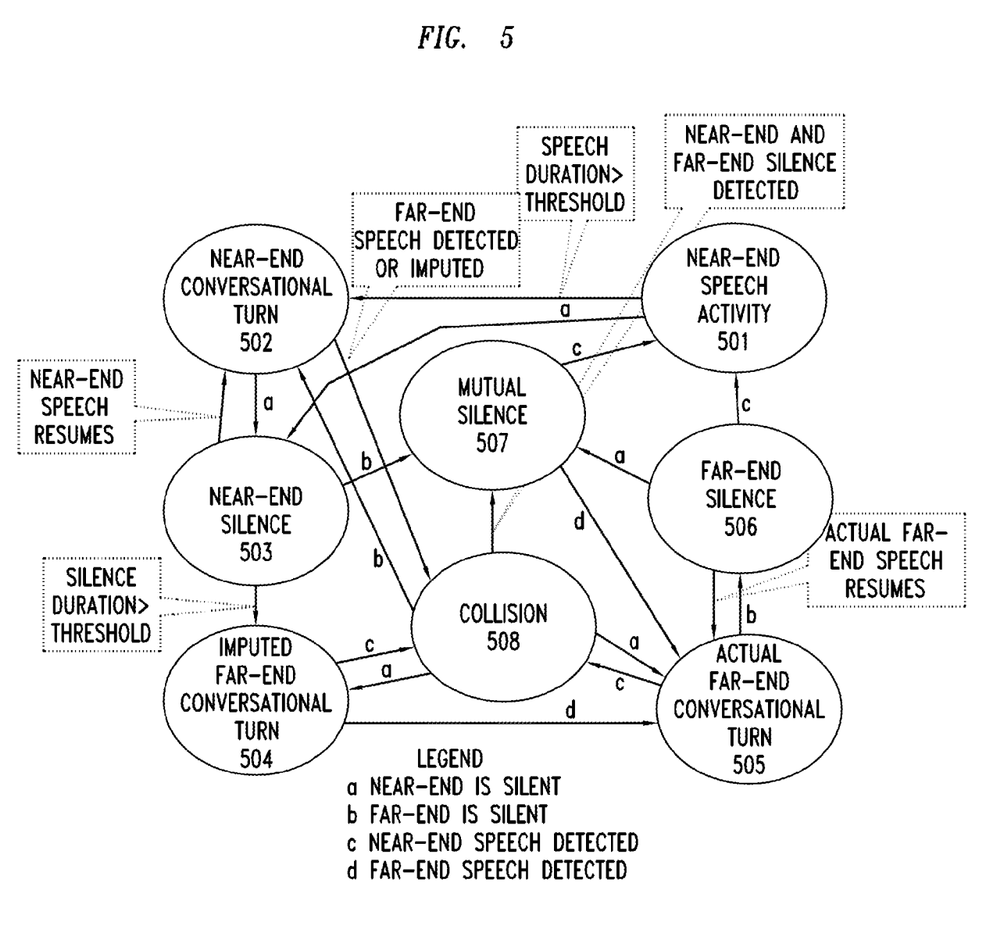
FIG. 5 is a diagram of state transitions in a machine such as that of FIG. 2.

Those skilled in the art will understand that in operation, the timing logic unit will recognize various possible states of the conversation between the near-end and far-end parties, and will respond accordingly. FIG. 5, to which attention is now directed, is a diagram of one possible set of conversational states that may be considered, together with an indication of at least some of the events that may trigger transitions among the states that are represented.

As seen in the figure, the Near-End Speech Activity state 501 exits via the following transitions: To Near-End Conversational Turn if the detected speech activity has a duration greater than a threshold, and to Near-End Silence if near-end silence is detected. The Near-End Conversational Turn state 502 exits via the following transitions: To Near-End Silence if near-end silence is detected, and to Collision if far-end speech is detected or, optionally, imputed. The Near-End Silence state 503 exits via the following transitions: To Near-End Conversational Turn if near-end speech resumes, to Mutual Silence if the far end is silent, and to Imputed Far-End Conversational Turn if the near end is silent for a duration greater than a threshold.

As seen in the figure, the Imputed Far-End Conversational Turn state 504 exits via the following transitions: To Actual Far-End Conversational Turn if far-end speech is detected, and, optionally, to Collision if near-end speech is detected. The Actual Far-End Conversational Turn state 505 exits via the following transitions: To Far-End Silence if the far end is silent, and to Collision if near-end speech is detected. The Far-End Silence state 506 exits via the following transitions: To Actual Far-End Conversational Turn if a resumption of far-end speech is detected, to Mutual Silence if the near end is silent, and to Near-End Speech Activity if near-end speech is detected.

As seen in the figure, the Mutual Silence state 507 exits via the following transitions: To Actual Far-End Conversational Turn if far-end speech is detected, and to Near End Speech Activity if near-end speech is detected. The Collision state 508 exits via the following transitions: To Mutual Silence if the near end and the far end are both silent, to Near-End Conversational Turn if far-end silence is detected, to Imputed Far-End Conversational Turn if far-end speech is only imputed and near-end silence is detected, and to Actual Far-End Conversational Turn if far-end speech is detected and near-end silence is detected.

The invention claimed is:

1. A method performed in a communication terminal, comprising:
    obtaining an estimate of latency in a conversation between a local speaker and each of one or more remote speakers separated from the local speaker by a communication medium;
    obtaining a timing indication of at least an end of a conversational turn vocalized by the local speaker;
    displaying an outbound graphical indication of progress of at least the end-of-turn across the communication medium toward at least a given one of said remote speakers with a transit time across the medium derived from the latency estimate;
    estimating, from the latency estimate, an arrival time at which at least the given remote speaker will receive the end-of-turn;
    imputing a conversational turn vocalized by at least the given remote speaker, including a start-of-turn imputed from the pertinent arrival time; and
    displaying an inbound graphical indication of progress, across the communication medium toward the local speaker, of at least the start-of-turn from at least the given remote speaker with a transit time across the medium derived from the latency estimate.

2. The method of claim 1, wherein the step of obtaining a timing indication comprises detecting at least a portion of at least one conversational turn vocalized by the local speaker, wherein the detected portion includes an end-of-turn.

3. The method of claim 2, wherein:
    the step of obtaining a timing indication comprises detecting both a start and an end of the conversational turn vocalized by the local speaker; and
    the outbound displaying step comprises displaying a graphical indication of progress of both the start and the end of said local conversational turn.

4. The method of claim 1, wherein the conversation is between the local speaker and one remote speaker.

5. The method of claim 1, wherein the conversation is between the local speaker and a plurality of remote speakers, and the steps of latency estimation, outbound display, arrival-time estimation, speech-turn imputation, and inbound display are performed for each remote speaker in the plurality.

6. The method of claim 1, wherein:
    the detecting step comprises obtaining timing indications of both a start and an end of the conversational turn vocalized by the local speaker; and
    the outbound displaying step comprises displaying a graphical indication of progress of both the start and the end of said local conversational turn.

7. The method of claim 6, wherein:
    the method further comprises detecting an end of the conversational turn vocalized by at least the given remote speaker; and
    the inbound displaying step comprises continuously displaying an inbound graphical indication of progress only until said remote end-of-turn is detected.

8. The method of claim 1, wherein the latency estimate is obtained from an echo canceller in the communication terminal.

9. The method of claim 1, wherein the latency estimate is obtained from a processor, and the method further comprises:
    identifying occurrences of conversational events of one or more types in a portion of the conversation having a duration;
    measuring a fraction of the duration during which each said event type occurs; and
    in the processor, computing the latency estimate from said measured fraction or fractions.

10. The method of claim 1, wherein the latency estimate is obtained from a processor, and the method further comprises:
    obtaining an indicator of a local time of an end-of-turn from the local speaker;
    then obtaining an indicator of a local time of arrival of the next start-of-turn from a remote speaker; and
    in the processor, estimating the latency from the difference between the times of said local end-of-turn and the arrival of said remote start-of-turn.

11. The method of claim 1, wherein the latency estimate is an estimate of the time for speech to undergo a round-trip through the communication medium from the local speaker to a remote speaker and back, and the outbound and inbound graphical indications of progress are displayed with transit times of one-half the estimated round-trip time.

12. Apparatus, comprising:
a circuit configured to provide an estimate of latency in a conversation between a local speaker and at least one remote speaker separated from the local speaker by a communication medium;
a speech detection circuit configured to detect speech vocalized by the local speaker and to provide an indication of at least an end of a conversational turn taken by the local speaker;
an estimator configured for estimating, from the latency estimate, an arrival time at which the remote speaker will receive the end-of-turn;
a display generator; and
a display;
wherein the display generator is configured to generate, on the display, an outbound graphical indication of progress of at least the end-of-turn across the communication medium toward the remote speaker with a transit time across the medium derived from the latency estimate;
wherein the display generator is further configured to generate, on the display, an inbound graphical indication of progress, across the communication medium toward the local speaker, of at least a start of a conversational turn imputed to the remote speaker; and
wherein the display generator is further configured to start the display of the conversational turn imputed to the remote speaker at a time derived from the estimated time at which the remote speaker receives the local speaker's end-of-turn, and to progress the display of at least the remote speaker's start-of-turn across the communication medium with a transit time derived from the latency estimate.

13. The apparatus of claim 12, wherein the circuit configured to provide an estimate of latency comprises an echo canceller.

14. The apparatus of claim 12, wherein:
the circuit configured to provide an estimate of latency comprises a processor, and the processor is configured to:
identify occurrences of conversational events of one or more types in a portion of the conversation having a duration;
measure a fraction of the duration during which each said event type occurs; and
compute the latency estimate from said measured fraction or fractions.

15. The apparatus of claim 12, wherein the circuit configured to provide an estimate of latency comprises a processor, and the processor is configured to:
obtain an indicator of a local time of an end-of-turn from the local speaker;
obtain an indicator of a local time of arrival of the next start-of-turn from a remote speaker; and
estimate the latency from the difference between the times of said local end-of-turn and the arrival of said remote start-of-turn.

16. The apparatus of claim 12, wherein the latency estimate is an estimate of the time for speech to undergo a round-trip through the communication medium from the local speaker to a remote speaker and back, and the display generator is configured to display the outbound and inbound graphical indications of progress with transit times of one-half the estimated round-trip time.

* * * * *